United States Patent [19]

Kaufman et al.

[11] Patent Number: 5,292,353
[45] Date of Patent: Mar. 8, 1994

[54] AIR SCRUBBER

[75] Inventors: Arnold S. Kaufman, Studio City; Robert L. Anderson, Van Nuys, both of Calif.; Donald W. Alwood, Mt. Pleasant, Mich.; James T. Otenbaker, Mt. Pleasant, Mich.; Frederick F. Fritz, Mt. Pleasant, Mich.

[73] Assignees: The Delfield Company, Mount Pleasant, Mich.; Renco Systems, Inc., Glendale, Calif.

[21] Appl. No.: 725,591

[22] Filed: Jul. 3, 1991

[51] Int. Cl.5 .................. B01D 47/02; B01D 50/00
[52] U.S. Cl. ........................................ 55/227; 55/245; 55/255; 55/256; 55/259; 55/260
[58] Field of Search .......... 55/227, 244, 245, 248-250, 55/255, 256, 259, 260

[56] References Cited

U.S. PATENT DOCUMENTS

| | | | |
|---|---|---|---|
| 1,751,915 | 3/1930 | Hall et al. | 55/255 X |
| 2,199,632 | 5/1940 | Keyes | 183/18 |
| 2,272,995 | 2/1942 | Neumann | 183/8 |
| 2,403,545 | 7/1946 | Nutting | 55/249 X |
| 2,527,004 | 10/1950 | Fett | 55/248 |
| 2,812,167 | 11/1957 | Wroth | 55/244 X |
| 3,130,024 | 4/1964 | Vaughan | 55/227 |
| 3,246,455 | 4/1966 | Boddy | 55/319 |
| 3,248,858 | 5/1966 | Toke | 55/227 |
| 3,321,191 | 5/1967 | Najarian | 55/256 X |
| 3,335,551 | 8/1967 | Golay | 55/237 |
| 3,381,679 | 5/1968 | Gonzalez | 126/299 |
| 3,591,947 | 7/1971 | Sexton | 55/259 X |
| 3,624,696 | 11/1971 | Cohen et al. | 55/248 X |
| 3,731,462 | 5/1973 | Costarella et al. | 55/228 |
| 3,756,580 | 9/1973 | Dunn | 55/255 X |
| 3,778,979 | 12/1973 | Friedling et al. | 55/227 |
| 3,785,124 | 1/1974 | Gaylord | 55/118 |
| 3,786,739 | 1/1974 | Wright | 98/115 |
| 3,810,349 | 5/1974 | Rebours | 55/248 |
| 3,823,531 | 7/1974 | Crawley | 55/233 |
| 3,841,062 | 10/1974 | Molitor et al. | 55/223 |
| 3,854,388 | 12/1974 | King | 98/115 |
| 3,865,193 | 2/1975 | Hall | 169/65 |
| 3,885,929 | 5/1975 | Lyon et al. | 410/206 |
| 3,907,525 | 9/1975 | King | 55/122 |
| 4,038,056 | 7/1977 | Diechuk et al. | 55/238 |
| 4,066,064 | 1/1978 | Vandas | 126/299 |
| 4,071,019 | 1/1978 | King | 126/299 E |
| 4,084,947 | 4/1978 | Ear | 55/242 |
| 4,101,299 | 7/1978 | Bertucci | 55/222 |
| 4,103,676 | 8/1978 | Kastner | 126/299 E |
| 4,124,021 | 11/1978 | Molitor | 126/299 E |
| 4,129,179 | 12/1978 | Molitor | 165/101 |
| 4,134,394 | 1/1979 | Otenbaker | 126/299 |
| 4,172,865 | 10/1979 | Steier | 55/259 X |
| 4,231,765 | 11/1980 | Scott | 55/90 |
| 4,281,635 | 8/1981 | Gaylord | 126/299 E |
| 4,290,784 | 9/1981 | Rawicki | 55/95 |
| 4,323,373 | 4/1982 | Fritz | 55/96 |
| 4,351,652 | 9/1982 | Wisting | 55/229 |
| 4,407,266 | 10/1983 | Molitor | 126/299 D |
| 4,483,316 | 11/1984 | Fritz et al. | 126/299 |
| 4,484,563 | 11/1984 | Fritz et al. | 126/299 |
| 4,784,114 | 11/1988 | Muckler et al. | 126/299 E |
| 4,818,259 | 4/1989 | Marano | 55/255 X |
| 4,822,385 | 4/1989 | Strege et al. | 55/249 X |
| 4,987,882 | 1/1991 | Kaufman | 126/299 |
| 5,069,197 | 12/1991 | Wisting | 126/299 |

FOREIGN PATENT DOCUMENTS

| | | | |
|---|---|---|---|
| 1245325 | 7/1967 | Fed. Rep. of Germany | 55/248 |
| 2726083 | 6/1976 | Fed. Rep. of Germany | |
| 724635 | 2/1955 | United Kingdom | 55/256 |
| 1355908 | 6/1974 | United Kingdom | 55/255 |

Primary Examiner—Robert Spitzer
Attorney, Agent, or Firm—Harness, Dickey & Pierce

[57] ABSTRACT

A water washed air scrubber in which the contaminated air is first directed toward the surface of a bath of water and cleaning agent at relatively high velocity to create adequate turbulence to achieve a scrubbing action to remove a majority of the contaminate, and thereafter passed through a filter to remove any remaining liquid and/or contaminate.

43 Claims, 6 Drawing Sheets

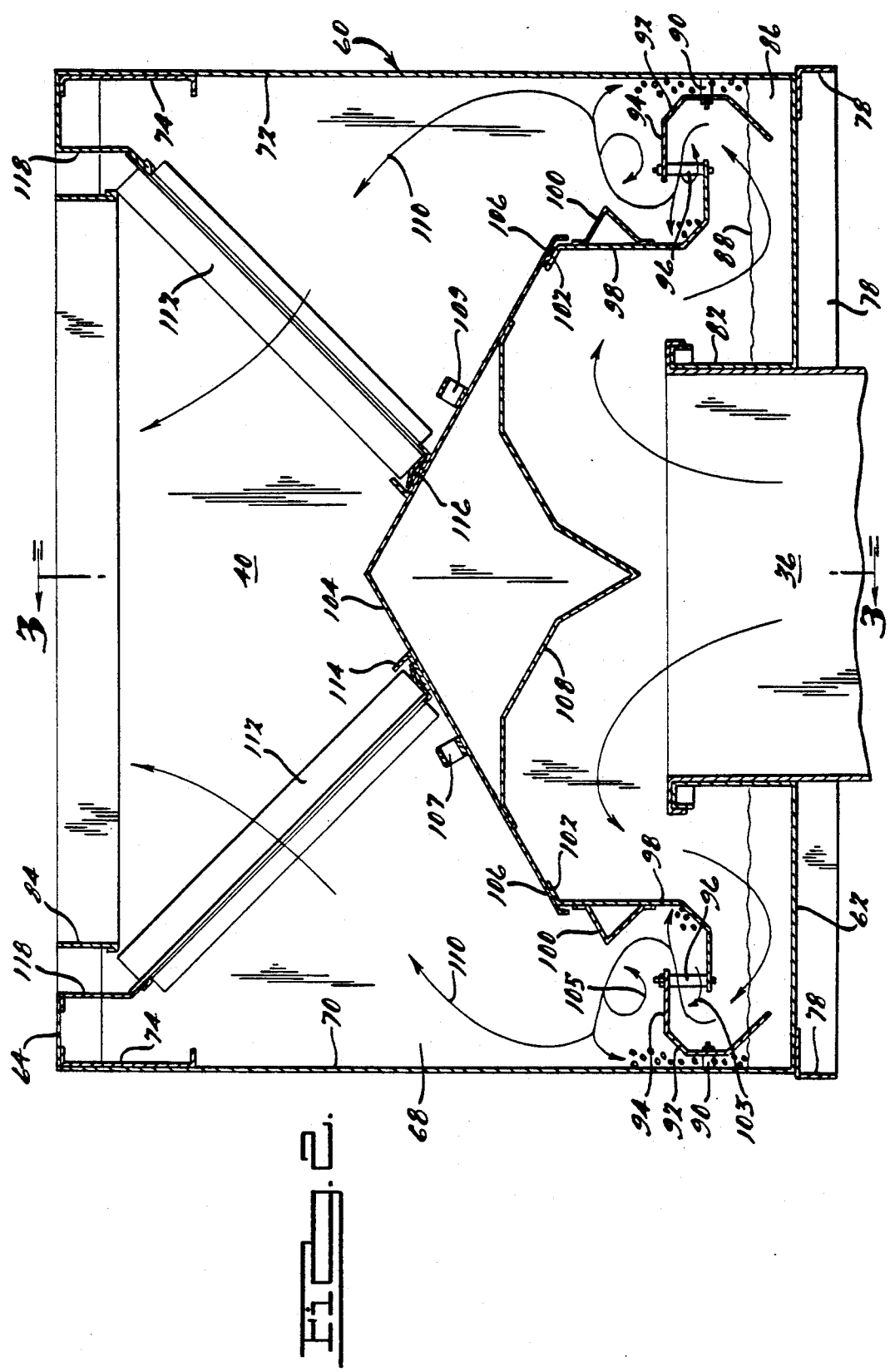

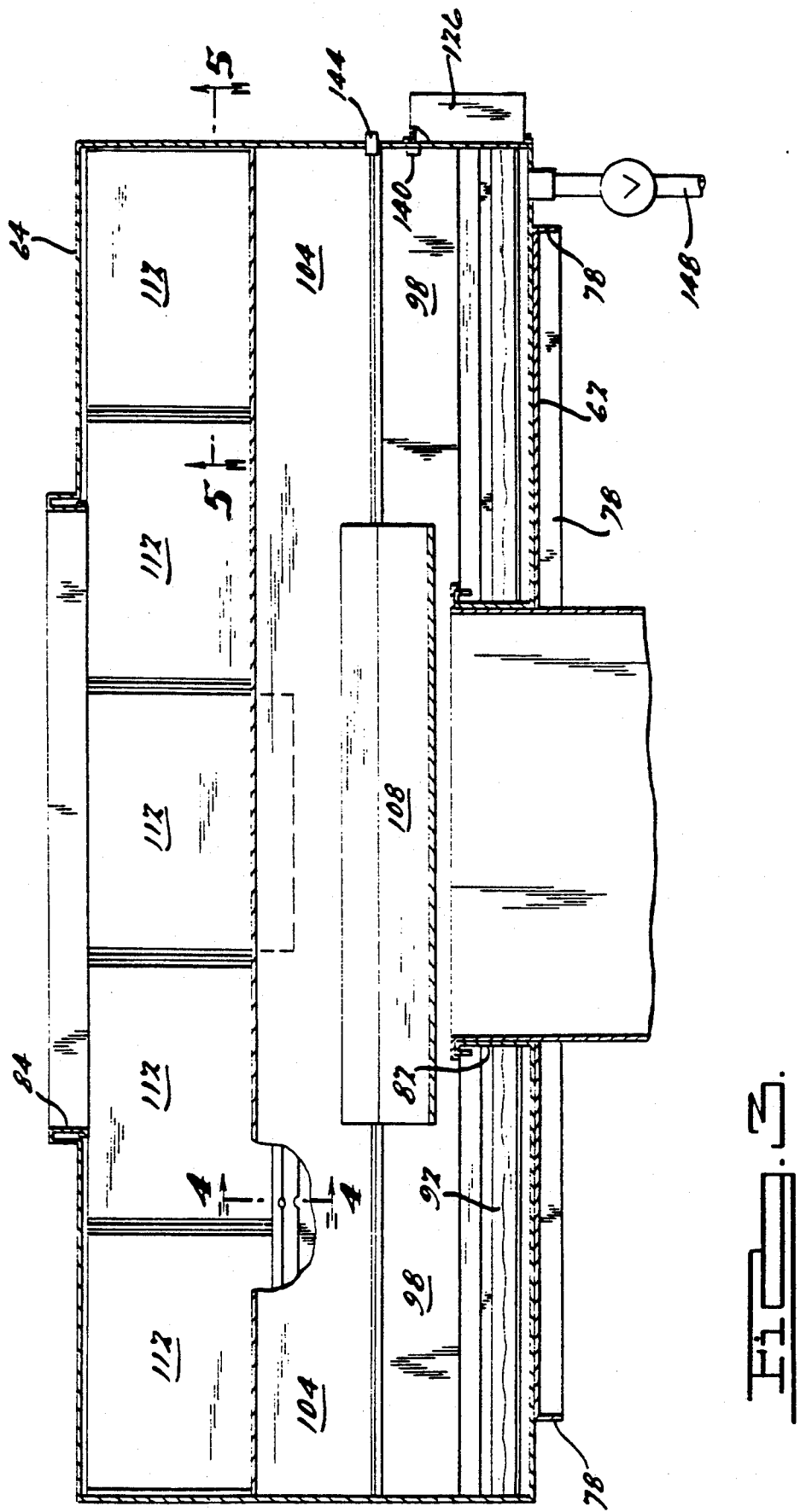

AIR SCRUBBER

BACKGROUND AND SUMMARY OF THE INVENTION

This invention relates to air cleaning apparatus, and more particularly to a water washed air scrubber for removing grease and other impurities from the exhaust system for a cooking appliance in a restaurant kitchen.

As is well recognized, the exhausting of any products into the atmosphere now raises significant environmental issues, as a result of which very strict regulations have recently been passed to deal with such issues. The normal exhaust from a restaurant kitchen can therefore present an environmental problem, in addition to the established fire hazard and roof deterioration problems resulting from grease carryover.

It is therefore a primary object of this invention to provide an improved exhaust air scrubber, particularly suited but not limited to use in cleaning the exhaust air from restaurant cooking appliance hoods, which is (a) relatively simple in construction and inexpensive to manufacture and maintain, (b) highly efficient in grease and other contaminant removal, (c) economical in power consumption, (d) presents no slipperiness hazard resulting from water spillage on the kitchen floor, (e) does not require any more than minimum kitchen ceiling height, (f) does not utilize any kitchen space and (g) has reliable means for sensing and maintaining cleaning fluid level and composition.

The present invention is an improvement over the air scrubber disclosed in U.S. Pat. No. 4,323,373.

Additional objects, advantages, and features of the present invention will become apparent from the following description and appended claims, taken in conjunction with the accompanying drawings.

BRIEF DESCRIPTION OF THE DRAWINGS

FIG. 2 is a vertical transverse sectional view through the center portion of the air scrubber of the present invention, the plane of the view being parallel to the plane of FIG. 1;

FIG. 8 is an end elevational view of the level sensing unit forming a part of the air scrubber of the present invention, with parts broken away;

FIG. 9 is a sectional view taken substantially along line 9—9 in FIG. 8; and

DETAILED DESCRIPTION OF THE PREFERRED EMBODIMENTS

Figure 1:
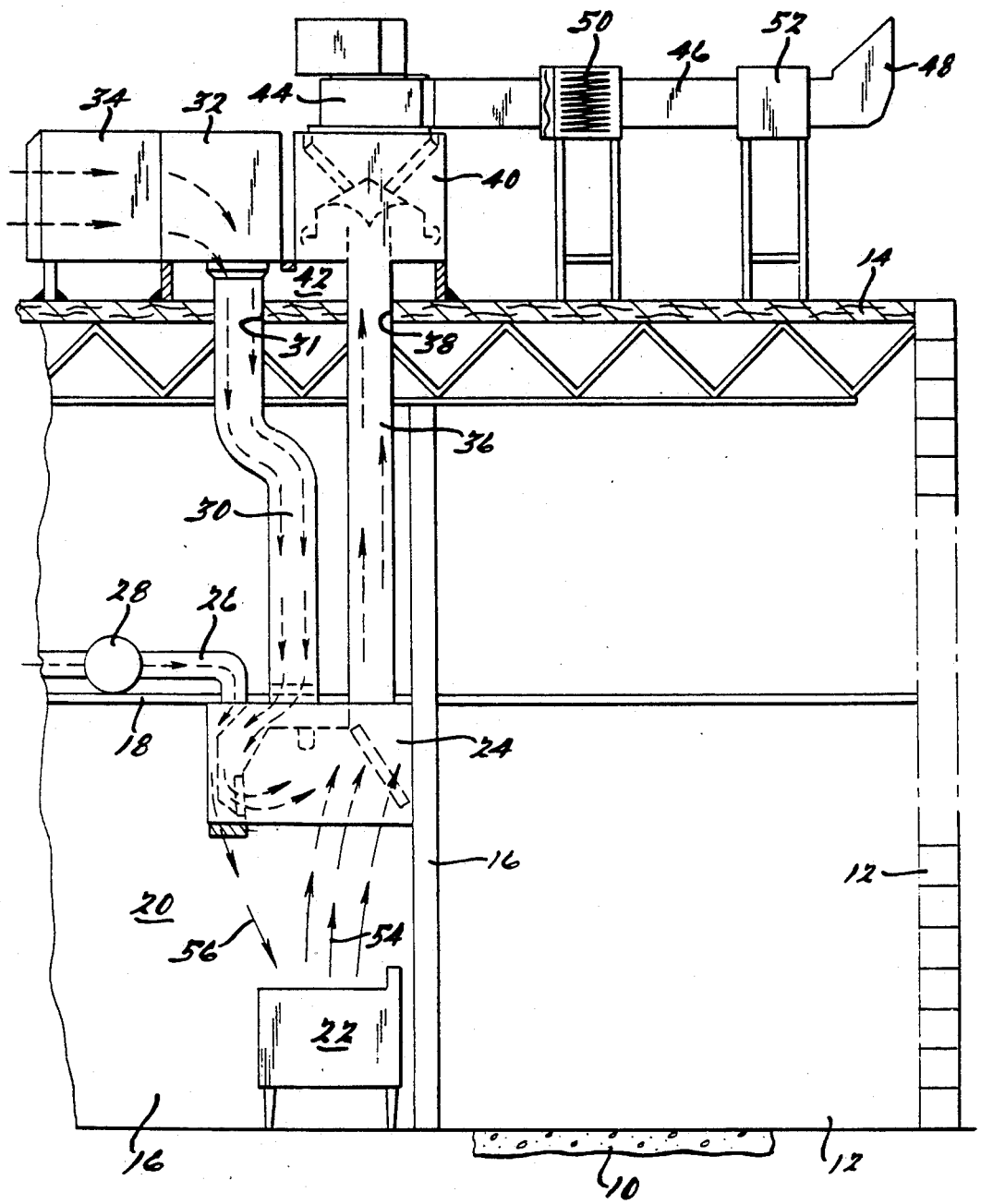
FIG. 1 is a somewhat schematic vertical sectional view through a portion of a typical kitchen and its encompassing building, showing an exemplary kitchen exhaust system incorporating the exhaust air scrubber of the present invention.

Although the present invention is suitable for use in a number of different applications (such as for the removal of oil mist, paint mist, acid fumes, dust, or for the recovery of precious metals, or like applications), it is illustrated for exemplary purposes embodied in an exhaust system for the cooking appliance in a restaurant kitchen. With reference to FIG. 1, the overall system is disposed in a building having a floor 10, exterior walls 12, a roof 14, as well as interior walls 16 and a ceiling 18 defining a kitchen 20 in which is disposed a cooking appliance 22, such as a standard restaurant range. The exhaust system comprises a canopy hood 24 to which is supplied inside air via a duct 26 and a fan 28, and outside air via a duct 30 passing through a hole 31 in roof 14 and connected to a roof-mounted supply fan 32 which draws fresh air in through an inlet plenum 34. Hood 24 is preferably a compensating hood of the type illustrated in U.S. Pat. Nos. 4,134,394, 4,483,316 and 4,484,563, the disclosures of which are hereby incorporated herein by reference; however, the present invention is also perfectly suited for use in exhaust systems which do not use compensating hoods.

The grease laden air from hood 24 is exhausted via a duct 36 which passes through an opening 38 in roof 14 to the air scrubber 40 which is mounted on a roof curb 42 surrounding openings 31 and 38. Supply fan 32 is also mounted on curb 42. An exhaust fan 44 mounted on top of scrubber 40 draws the exhaust air through scrubber 40 at a relatively high velocity and then exhausts the scrubbed substantially grease-free air leaving scrubber 40 to the atmosphere via a duct 46 connected to a discharge scoop 48. Optionally, duct 46 may be provided with a smoke bag unit 50 for smoke removal and/or an electrostatic precipitator 52 for further air purification. Except for the scrubber, all the other components of the system are known in the art. As can be seen, contaminated air 54 from immediately above the range is drawn up hood 24 by fan 44 with the make-up air being supplied by ducts 26 and 30, a portion 56 of which is deflected downwardly to cool kitchen personnel working at the range. Although the roof is a preferable location for the scrubber, it can alternately be mounted on a higher floor in the same building, or in the kitchen itself, depending on the situation.

The novel air scrubber of the present invention is best illustrated in FIGS. 2–5. Scrubber 40 comprises an elongated generally rectangular sheet metal housing 60 having a bottom wall 62, a top wall 64, end walls 66 and 68, and side walls 70 and 72, assembled in a conventional manner preferably by welding. Longitudinally extending reinforcing channel members 74 are affixed to the housing along the upper side edges thereof to strengthen the housing and help support fan 44, and longitudinally and transversely extending mounting members 78 are affixed to the lower side edges of the housing to facilitate mounting of the scrubber on curb 42.

As best shown in FIG. 2, scrubber 40 is of substantially uniform cross-section throughout its length, having an inlet opening defined by a continuous flange 82 projecting upwardly from bottom wall 62 and an outlet opening defined by a continuous flange 84 which projects downwardly from a slightly raised center portion of top wall 64, both of which openings are centrally located. Contaminated air is delivered to the scrubber by duct 36 which is sealingly connected to flange 82, and scrubber air leaves the scrubber through the outlet opening defined by flange 84 and passes directly into fan 44.

Flange 82, in combination with bottom wall 62 and end and side walls 68–72, define a liquid-proof pan for holding a bath 86 of cleaning fluid comprising water and a cleaning agent (such as soap, a detergent, an emulsifier, or the like), the level 88 of which is disposed below the top edge of flange 82. Affixed to each of side walls 70 and 72, using a plurality of spaced spacer-fasteners 90, is an inwardly facing longitudinally extending generally U-shaped horizontal sheet metal water baffle 92 the lower edge of which is disposed below the normal level of bath 86. Each baffle 92 has a generally horizontal inwardly facing flange 94. Affixed adjacent the inner edge of each flange 94, using a plurality of spaced spacer-fasteners 96, is an outwardly facing longitudinally extending generally L-shaped horizontal sheet metal water baffle 98 the lower edge of which is disposed in the bight of baffle 92 to define a reversing air flow path. The outer face of each baffle 98 is provided with a horizontally disposed outward V-shaped sheet metal projection 100 for causing another reversal of the air flow in the opposite direction, with the resulting overall flow path being directed outwardly toward side walls 70 and 72, which causes yet another flow reversal.

Each baffle 98 has a longitudinally extending inwardly directed mounting flange 102. Disposed above and between flanges 102 is an inverted generally V-shaped elongated symmetrical sheet metal panel 104 which extends for the full length of the scrubber and is affixed to flanges 102. Attached to the lower surface of panel 104 in the center portion thereof which overlies the inlet opening is a generally V-shaped elongated symmetrical sheet metal air diverter 108. The center portion of panel 104 is removable to facilitate cleaning diverter 108, and therefore is attached to flanges 102 using a sealant adhesive. Handles 107 and 109 may be provided on the removable portion of panel 104 to facilitate removal.

Diverter 108 functions to split the inlet flow of contaminated air and direct each one-half through a 180° flow reversal and downwardly at relatively high velocity toward the surface of bath 86. This causes the surface of the bath to be pushed downwardly in the area around flange 82, which raises the level of the bath between baffles 90 and 98. This, combined with the surface liquid pitched up by the air flow (much like waves in a high wind), causes the air and liquid to intimately mix as the air passes through the baffles. The flow reversals caused by the baffles appear to give the liquid-laden air a spinning motion in both directions of rotation, such as shown at 103 and 105, to significantly enhance the mixing and cleaning action. This action is to be distinguished from that which occurs in known bubbling scrubbers where the air tends to follow the same path or "hole" in the bath and mixing is significantly inhibited. The grease and other impurities are ultimately removed from the air by dissolving coalescing and/or chemical action resulting from the intimate mixing of the cleaning liquid and the impurity-laden air.

Fan 44 should be sized sufficiently large (cfm and static pressure) that the flow of contaminated air is forced toward bath 86 with adequate velocity that there is relatively violent turbulence created, but not so much that all of the bath is lifted into the air stream. As can be visualized, all of the flow reversals after the bath cause the now impurity-laden entrained liquid in the air flow to be separated from the air by both inertia, and by coalescing action from impingement with a baffle or wall surface, from which the liquid simply drains or runs down the surface back into the bath. The fully scrubbed air is thus directed upwardly and inwardly, as indicated at 110, on each side of the scrubber.

Figure 5:
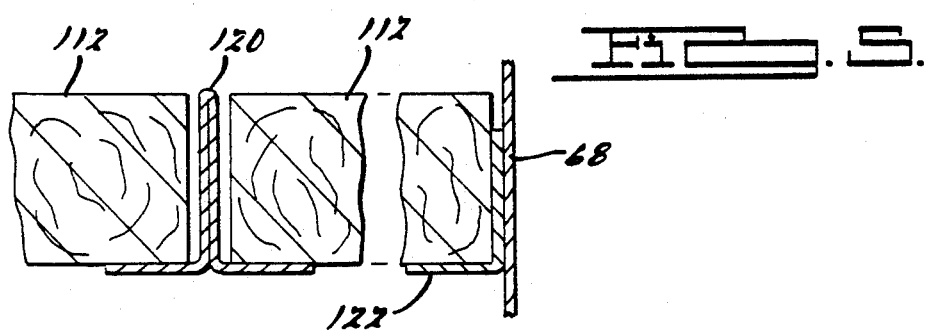
FIG. 5 is a fragmentary sectional view taken along line 5—5 in FIG. 3.
Figure 6:
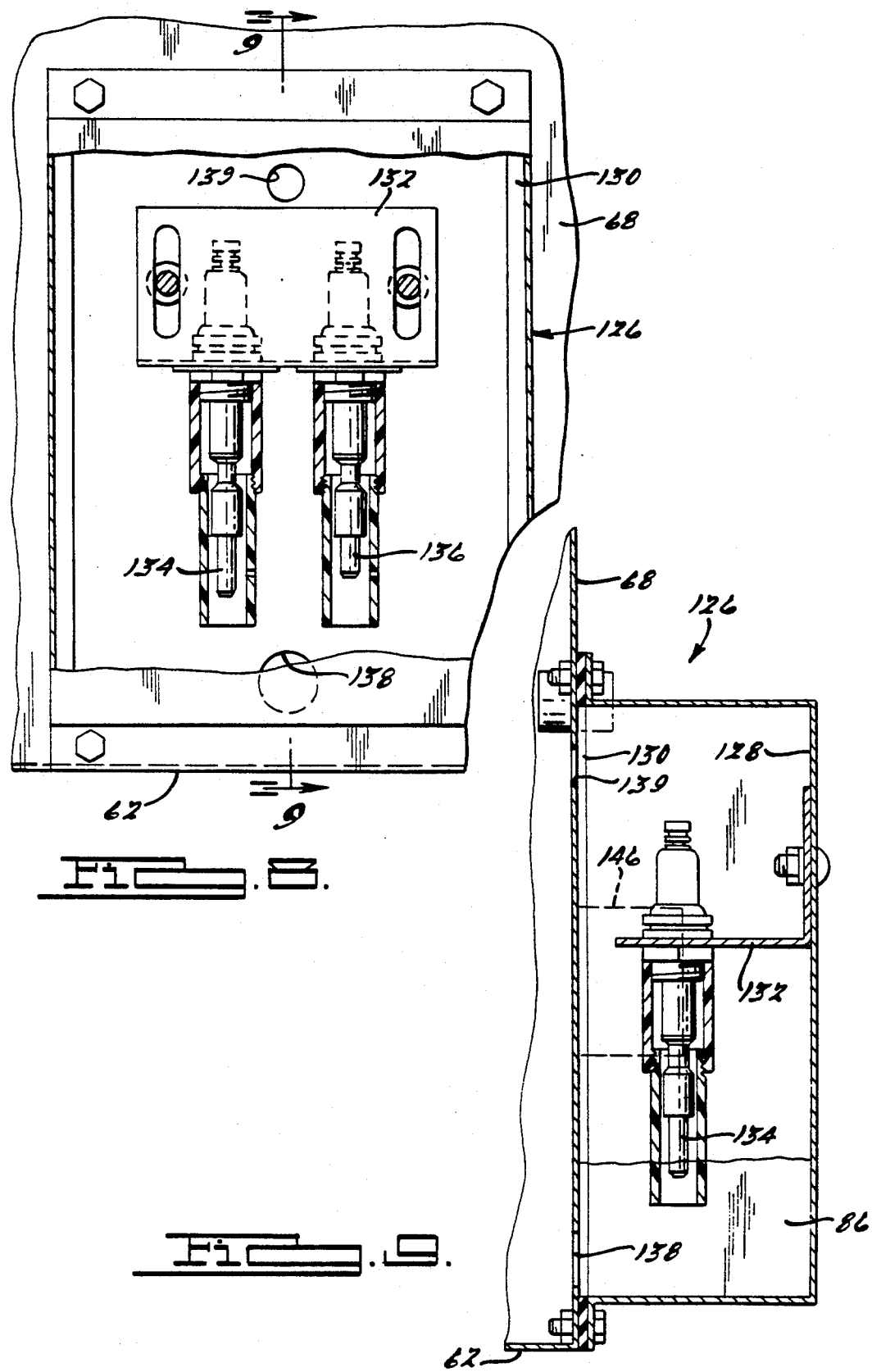
FIG. 6 is a top plan view of the air scrubber of the present invention.
Figure 7:
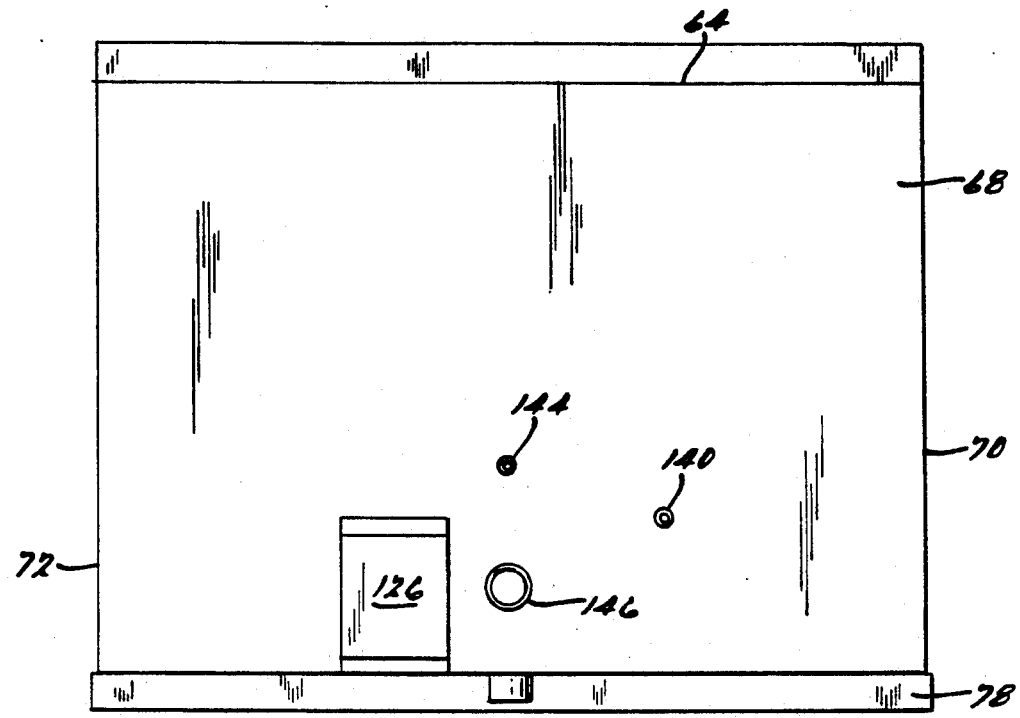
FIG. 7 is an end elevational view of the air scrubber of the present invention.

This air is now relatively free of grease and liquid, but does contain some smaller impurities and a liquid mist or dispersoid. To remove this the air flow is then filtered. This is accomplished by symmetrically disposed banks of removable filters 112 on each side of the scrubber extending from one end thereof to the other, and being inclined so as to be substantially transverse to the air flow, thus maximizing the effective area thereof, which in turn minimizes flow velocity therethrough and enhances filtering action and liquid drainage. Each filter 112 is independently removable for cleaning or replacement, with the lower ends thereof retained by a longitudinally extending generally channel-shaped sheet metal retainer 114 affixed to the upper surface of panel 104. Retainer 114 may have an arched sheet metal glider 116 disposed in the bottom thereof on which the filter sits, in order to facilitate drainage. Air flow over the tops of filters 112 is prevented by a longitudinally extending sheet metal baffle 118 on which the top edges of each filter can rest. As best shown in FIG. 5, the adjacent edges of each pair of filters 112 are supported upon an inverted T-shaped sheet metal support 120, the ends of which are affixed to retainer 114 and baffle 118, respectively, and the outermost edges of the end filters are supported upon angle brackets 122 affixed to the scrubber end walls. Each retainer 114 has a plurality of spaced holes 124 (FIG. 4) along both lower edges thereof to facilitate the drainage of filtered liquid back to bath 86. The resulting scrubbed and filtered exhaust air is thereafter drawn up through the scrubber outlet opening defined by flange 84.

Figure 3:
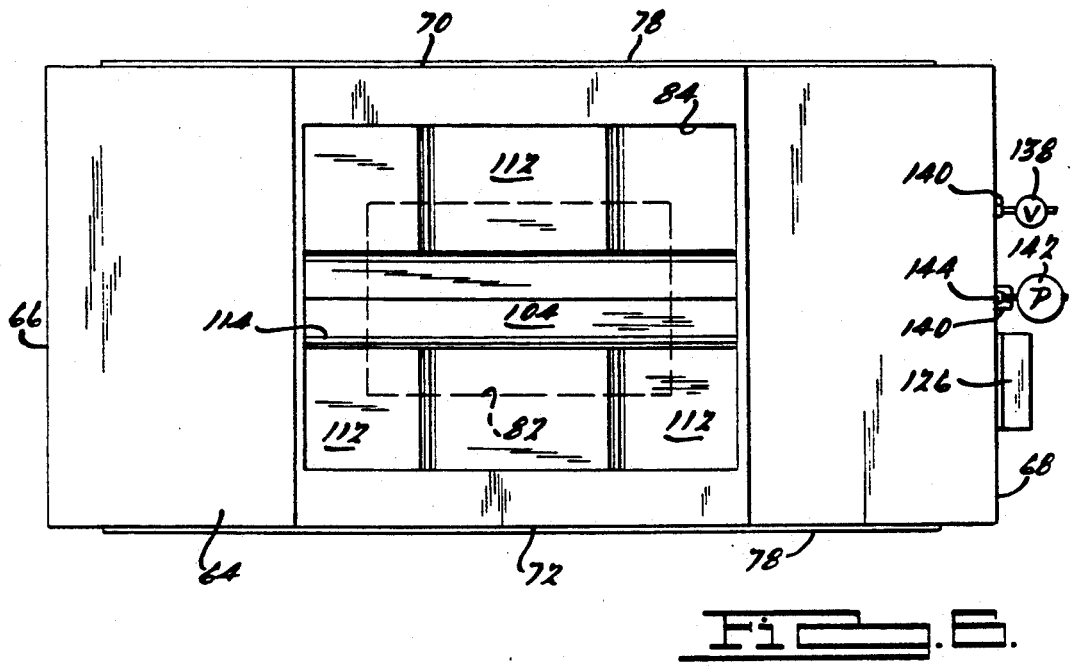
FIG. 3 is a longitudinal vertical sectional view taken substantially along line 3—3 in FIG. 2.
Figure 4:
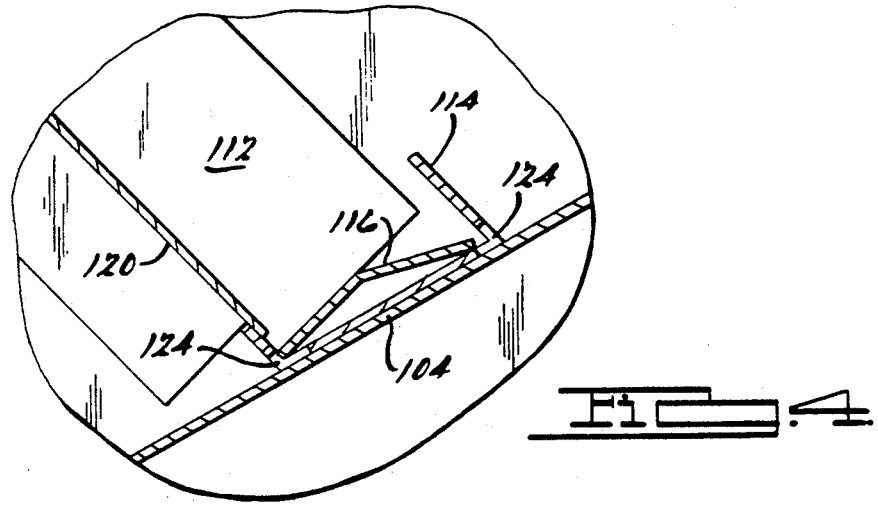
FIG. 4 is a fragmentary sectional view taken along line 4—4 in FIG. 3.

The level of the bath of cleaning liquid is automatically controlled by a suitable electrical or mechanical liquid level sensing unit 126 affixed outside end wall 68, where there is minimum turbulence of the bath. As best shown in FIGS. 3, 8 and 9, unit 126 is of conventional construction and comprises a sheet metal box 128 bolted to end wall 68 using a liquid-proof gasket 130, and having a bracket 132 therein supporting a low level probe 134 and a high level probe 136. End wall 68 has a liquid flow opening 138 and a vent opening 139 therethrough so that unit 126 has substantially turbulent-free bath 86 in the bottom thereof. Probes 134 and 136 sense the presence of liquid at the lower tip end in the usual manner to open and close an electric circuit to control the supply of make-up cleaning fluid. When both probes are liquid free the circuit (not shown) actuates a solenoid valve 138 to introduce a metered flow of fresh water through inlet fitting 140 into the scrubber, and actuates a pump 142 to supply the proper metered amount of cleaning agent through fitting 144, until both probes sense liquid. Thereafter, no further liquid is supplied until the level drops and both probes are liquid free. For safety's sake, an open overflow tube 146 may be provided. A valved drain 148 is also provided so that the entire bath can be drained and replaced periodically to remove all waste. In a conventional installation the bath might require replacement one or more times per day.

Figure 10:
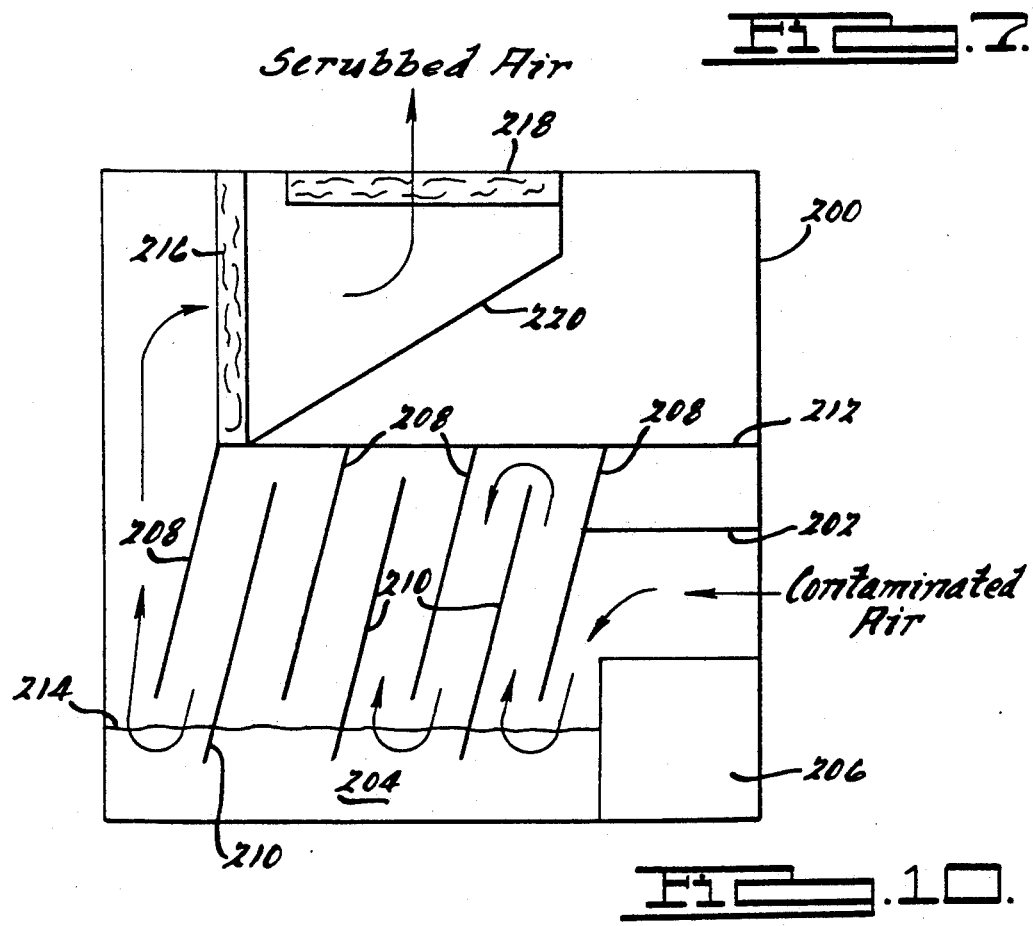
FIG. 10 is a diagrammatic view of an alternative embodiment of an air scrubber embodying certain principles of the present invention.

In FIG. 10 an alternative embodiment of the air scrubber is shown schematically, wherein the scrubber comprises a housing 200 having an inlet opening 202, a cleaning bath 204 in the bottom thereof, a liquid level control and replenishment unit 206, and a plurality of generally parallel and equally spaced slightly inclined pairs of baffles 208 and 210. Baffles 208 depend from a generally longitudinal partition 212 and have lower edges disposed slightly above the level 214 of bath 204, and baffles 210 are supported by the end walls of housing 200 with the upper edges thereof slightly spaced from partition 212 and the lower edges thereof disposed slightly below liquid level 214. The air flow through the baffles, as shown by the arrows, gives substantially the same scrubbing action as is achieved in the first embodiment. The scrubbed air then flows upwardly and serially through two filters 216 and 218 (similar to those in the first embodiment) in the manner shown. An inclined partition 220 is provided to guide the air flow upwardly and the filtered liquid draining downwardly back to the bath off the inner end of partition 212. As can be appreciated, the principles of operation of this embodiment are very similar to those described above with regard to the first embodiment. Furthermore, unit 206 can be the same as unit 126. The number of baffles 208 and 210 and the amount of spacing thereof from partition 212 and level 214 can be varied to achieve the desired turbulence without an excessive pressure drop.

The foregoing discussion discloses and discusses merely exemplary embodiments of the present invention. One skilled in the art will readily recognize from the accompanying drawings and claims, that various changes, modifications and variations can be made therein without departing from the spirit and scope of the invention as defined in the following claims.

What is claimed is:

1. An air scrubber for removing impurity from a flow of impurity-laden air, comprising:
   (a) a substantially fully enclosed housing having an inlet opening and an outlet opening, said housing being adapted to be mounted in the path of said flow of impurity-laden air with air entering said housing through said inlet opening and leaving said housing through said outlet opening;
   (b) means in said housing defining a pan adapted to contain a cleaning fluid bath;
   (c) scrubbing means in said housing having a deflector for deflecting inlet air toward the surface of said cleaning bath, said air undergoing an initial flow reversal before contacting said bath and a plurality of flow reversals after contacting said bath, said scrubbing means being operative to cause sufficient turbulence and mixing of the air and cleaning fluid bath to disperse said cleaning fluid throughout the air to remove a major portion of said impurity, substantially all of said fluid being provided by contact of said air with said bath; and
   (d) a filter disposed in said housing for enhancing removal of said impurity after said air contacts said bath.

2. An air scrubber as claimed in claim 1 wherein said cleaning bath is formed of water and a cleaning agent.

3. An air scrubber as claimed in claim 1 further comprising means for mounting said housing on a roof curb.

4. An air scrubber as claimed in claim 1 further comprising means for automatically controlling the level of said bath.

5. An air scrubber as claimed in claim 1 wherein said filter normally functions without being subjected to any liquid other than that carried by the air flow being filtered.

6. An air scrubber as claimed in claim 1 wherein at least two separate filters are disposed in said air flow.

7. An air scrubber as claimed in claim 6 wherein said two filters function in series with respect to one another.

8. An air scrubber as claimed in claim 6 wherein said two filters function in parallel with respect to one another.

9. An air scrubber as claimed in claim 1 wherein said scrubbing means causes said air to pick up cleaning liquid from the surface of the cleaning bath.

10. A restaurant kitchen air scrubber for an exhaust system having a flow of grease-laden air disposed above kitchen equipment, comprising:
    (a) a substantially fully enclosed housing having an inlet opening and an outlet opening, said housing being adapted to be mounted in the path of said flow of grease-laden air with air entering said housing through said inlet opening and leaving said housing through said outlet opening;
    (b) means in said housing defining a pan adapted to contain a cleaning fluid bath including water and a detergent;
    (c) scrubbing means in said housing having a deflector for deflecting grease-laden inlet air toward the surface of said cleaning bath, said air undergoing an initial flow reversal before contacting said bath and a plurality of flow reversals after contacting said bath, said scrubbing means including powered means operative to cause said air to flow with sufficient velocity to cause sufficient turbulence and mixing of the air and cleaning fluid to cause removal of a major portion of said impurity, substantially all of said cleaning fluid mixed with the air being provided by contact between said cleaning fluid bath and the air; and
    (d) a filter in said housing for removing moisture and/or grease from said air flow as it flows from said bath to said outlet opening.

11. A restaurant kitchen air scrubber as claimed in claim 10 wherein said filter normally functions without being subjected to any liquid other than carried by the air flow being filtered.

12. A restaurant kitchen air scrubber as claimed in claim 10 wherein at least two separate filters are disposed in said air flow.

13. A restaurant kitchen air scrubber as claimed in claim 12 wherein said two filters function in parallel with one another.

14. A restaurant kitchen air scrubber as claimed in claim 10 wherein said two filters function in series with one another.

15. A restaurant kitchen air scrubber as claimed in claim 10 further comprising means for automatically controlling the level of said bath.

16. A restaurant kitchen air scrubber as claimed in claim 10 further comprising means on said housing for mounting said scrubber to a roof curb on a restaurant roof.

17. An air scrubber for a system having a flow of impurity-laden air, comprising:
    (a) a substantially fully enclosed housing having an inlet opening and an outlet opening, said housing being adapted to be mounted in the path of said flow of impurity-laden air with air entering said housing through said inlet opening and leaving said housing through said outlet opening;

(b) means in said housing defining a pan adapted to contain a bath of cleaning liquid;

(c) deflector means in said housing having a deflector disposed directly in the path of said flow so that the air directly strikes said deflector, said deflector splitting the flow of impurity-laden inlet air into a plurality of flow paths before said air contacts said cleaning bath, said deflector means directing each flow path of air into said cleaning bath with sufficient velocity to cause sufficient turbulence and mixing of the air and bath to cause removal of a major portion of said impurity; and (d) means for causing said impurity-laden air to undergo a plurality of flow reversals.

18. An air scrubber as claimed in claim 17 further comprising means for mounting said housing on a roof curb.

19. An air scrubber as claimed in claim 17 further comprising means for automatically controlling the level of said bath.

20. An air scrubber as claimed in claim 17 further comprising a filter disposed in said housing for removing impurities remaining in said air flow after passing through said bath.

21. An air scrubber as claimed in claim 20 wherein said filter normally functions without being subjected to any liquid other than that carried by the air flow being filtered.

22. An air scrubber as claimed in claim 20 wherein at least two separate filters are disposed in said air flow.

23. An air scrubber as claimed in claim 22 wherein said two filters function in series with respect to one another.

24. An air scrubber as claimed in claim 22 wherein said two filters function in parallel with respect to one another.

25. An air scrubber as claimed in claim 17 wherein said bath includes a cleaning agent for dissolving a major portion of said impurity.

26. An air scrubber for a system having a flow of impurity-laden air, comprising:

(a) an elongated generally rectangular housing having a bottom wall, a top wall, end walls and side walls;

(b) an inlet opening defined in said bottom wall;

(c) an outlet opening defined in said top wall, both of said openings being centrally located;

(d) a liquid-proof pan for holding a bath of cleaning fluid disposed in said housing;

(e) an inwardly facing longitudinally extending generally U-shaped horizontal first baffle affixed to each of said side walls with the lower edge of said baffle being disposed below the normal level of said bath, each said first baffle having a generally horizontal inwardly facing flange;

(f) an outwardly facing longitudinally extending generally L-shaped horizontal second baffle affixed adjacent the inner edge of each last-mentioned flange with the lower edge of each said second baffle being disposed in the bight of the adjacent one of said first baffles to define a first reversing air flow path;

(g) a horizontally disposed outwardly extending V-shaped projection affixed to the outer face of each said second baffles for causing another reversal of the air flow in the opposite direction;

(h) an inverted generally V-shaped elongated symmetrical panel extending for the full length of the scrubber and being affixed to and between said second baffles; and (i) a generally V-shaped elongated symmetrical air diverter attached to the lower surface of said panel in the center portion thereof which overlies the said inlet opening for splitting the inlet flow of contaminated air and directing each one-half through a 180° flow reversal and downwardly at relatively high velocity toward the surface of said bath, said flow of contaminated air being forced into said bath with adequate velocity that there is relatively violent turbulence created, but not so much that all of the bath is drawn out of the pan, said turbulence acting to wash or scrub the air to remove the majority of the grease and other impurities therein, said flow reversals after the bath enhancing impurity removal and causing entrained liquid in the air flow to be separated from the air by both inertia, and by coalescing action from impingement with said baffles and wall surfaces, from which the liquid simply drains back to the bath.

27. An air scrubber as claimed in claim 26 further comprising transversely extending mounting members affixed to the lower side edges of said housing to facilitate mounting of the scrubber on a roof curb.

28. An air scrubber as claimed in claim 26 wherein said inlet opening is defined by a continuous lower flange projecting upwardly from said bottom wall.

29. An air scrubber as claimed in claim 28 wherein said pan is defined by said lower flange, in combination with said bottom wall and end and side walls for holding a bath of cleaning fluid disposed in said housing, the level of said bath being disposed below the top edge of said lower flange.

30. An air scrubber as claimed in claim 26 wherein said first baffles are affixed to said side walls using a plurality of spaced spacer-fasteners.

31. An air scrubber as claimed in claim 26 wherein said second baffles are affixed to said last-mentioned flanges using a plurality of spaced spacer-fasteners.

32. An air scrubber as claimed in claim 26 wherein the center portion of said panel is removable to facilitate cleaning said diverter.

33. An air scrubber as claimed in claim 26 further comprising symmetrically disposed banks of removable filters on each side of the scrubber extending from one end thereof to the other and being substantially transverse to the air flow, thereby maximizing the effective area thereof and minimizing the flow velocity therethrough.

34. An air scrubber as claimed in claim 33 wherein each filter is independently removable for cleaning or replacement.

35. An air scrubber as claimed in claim 33 comprising a pair of longitudinally extending generally channel-shaped sheet metal retainers affixed to the upper surface of said panel for retaining said filters.

36. An air scrubber as claimed in claim 35 further comprising means defining a plurality of spaced holes along the lower edge of said retainer to facilitate the drainage of filtered liquid back to said bath.

37. An air scrubber as claimed in claim 26 further comprising control means for automatically controlling the level of said bath.

38. An air scrubber as claimed in claim 37 wherein said control means operates in response to a low liquid level in said bath to introduce a metered flow of water and a separate metered flow of cleaning agent into said bath until the desired level is achieved.

39. An air scrubber for removing impurity from an impurity-laden air stream, comprising:

a housing having an inlet and an outlet, said air stream flowing into said housing through said inlet and flowing out from said housing through said outlet;

a cleaning fluid bath contained in said housing;

scrubbing means in said housing for causing turbulence and intimate mixing of the air and cleaning fluid bath, for causing said air to pick up and suspend fluid from the surface of said cleaning fluid bath, and for causing said suspended fluid to disperse throughout said air stream, substantially all of said suspended fluid being provided by contact of said air with said bath, said scrubbing means forming a mist of said suspended fluid in said air stream; and a filter disposed in said housing for separating said suspended fluid from said air stream after contacting said bath so as to remove a major portion of said impurity from said air stream.

40. The air scrubber as set forth in claim 39, which further comprises return means for returning said separated fluid to said cleaning bath.

41. The air scrubber as set forthin claim 39, wherein said scrubbing means further comprises a tortuous flow path formed of a plurality of flow reversals.

42. The air scrubber as set forth in claim 39, wherein said scrubbing means further comprises an expansion chamber.

43. The air scrubber as set forth in claim 39, which further comprises means for splitting the air stream into a plurality of flow paths.

* * * * *